United States Patent
Piotrowski et al.

(10) Patent No.: US 6,499,369 B1
(45) Date of Patent: Dec. 31, 2002

(54) RACK BALL NUT INTERFACE

(75) Inventors: Mark Stephen Piotrowski, Freeland, MI (US); Randall S Hetzner, Birch Run, MI (US); Ronald John Hansen, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 112 days.

(21) Appl. No.: 09/657,918

(22) Filed: Sep. 8, 2000

Related U.S. Application Data
(60) Provisional application No. 60/154,272, filed on Sep. 16, 1999.

(51) Int. Cl.$^7$ .............................................. F16H 27/02
(52) U.S. Cl. ......................... 74/89.42; 74/409; 384/517
(58) Field of Search ................... 74/89.42, 409, 74/440; 384/517, 518, 563

(56) References Cited

U.S. PATENT DOCUMENTS

| | | | | |
|---|---|---|---|---|
| 3,372,605 A | * | 3/1968 | Orner | 74/459 |
| 4,173,376 A | * | 11/1979 | Standing et al. | 308/189 A |
| 4,773,497 A | | 9/1988 | Carlson et al. | 180/79.1 |
| 5,090,243 A | | 2/1992 | Holdren et al. | 73/514 |
| 5,501,118 A | * | 3/1996 | Benton | 74/441 |
| 5,547,326 A | | 8/1996 | Overhues | 411/544 |
| 5,644,951 A | * | 7/1997 | Hatamura | 74/89.15 |
| 6,186,268 B1 | * | 2/2001 | Onodera et al. | 180/444 |

FOREIGN PATENT DOCUMENTS

EP          0 303147 A1 *  8/1988

* cited by examiner

Primary Examiner—David Fenstermacher
(74) Attorney, Agent, or Firm—Edmund P. Anderson

(57) ABSTRACT

A ball nut drive assembly includes a ball nut having a bore extending axially therethrough, a ball screw extending through the bore of the ball nut and being cooperatively engaged with the ball nut, and a spring compliant member received on the ball screw and positioned adjacent the ball nut. The spring compliant member is tensioned to bias the ball nut in the axial direction along the ball screw. The ball nut is positioned within a housing, which is preferably fabricated of aluminum, and is generally rotatably supported therein by first and second sets of ball bearings. The spring compliant member is in intimate contact with a first inner surface of the housing and biases the ball nut against a second inner surface of the housing. Races encapsulating the first and second sets of bearings may be positioned adjacent the ball nut and in intimate contact with the first and second inner surfaces of the housing. The spring compliant member may be a spring wave washer, a Belleville washer, or some other type of spring compliant device.

14 Claims, 3 Drawing Sheets

RACK BALL NUT INTERFACE

CROSS REFERENCE TO RELATED APPLICATIONS

This application claims the benefit of U.S. Provisional Application Serial No. 60/154,272 filed Sep. 16, 1999, which is incorporated herein by reference in its entirety.

TECHNICAL FIELD

The present invention relates to the interface between a rack and a ball nut and the lateral movement of the ball nut relative to the rack.

BACKGROUND OF THE INVENTION

Ball nut drive assemblies are widely used in the steering systems of motor vehicles and are generally configured to be installed around a steering member and driven by an electric motor. The ball nut drive assembly is typically housed in a cast iron casing and typically comprises a ball nut rotatably positioned intermediate a bearing thrust adjuster and a bearing annulus on a ball screw that forms a portion of the steering member. The rotational motion of the ball nut via the electric motor causes the ball screw to laterally translate the ball nut. The lateral motion of the ball screw is imparted to the steering rod and to steerable wheels rotatably connected to the ends of the steering rod to alter the position of the wheels relative to the vehicle body, thereby steering the vehicle.

One of the more common problems associated with ball nut drive assemblies involves axial play or backlash between the ball nut and the ball screw. This backlash, which is a function of the manufacturing tolerances associated with the ball nut drive assembly components, causes uneven wear, noise, and poor response when either the ball screw or the ball nut begin traveling axially along the other. Since the manufacturing tolerances are generally critical to the smooth translation of the ball nut along the ball screw, the bearing thrust adjuster is sufficiently dimensioned and preloaded to bias the ball nut against the bearing annulus, thereby preventing any free play in the lateral direction along the steering member.

SUMMARY OF THE INVENTION

The present invention contemplates the replacement of the conventional bearing thrust adjuster, thrust adjuster lock nut, and bearing annulus with a spring compliant member. By replacing the afore-mentioned items with the spring compliant member, the need for a separate bearing pre-load arrangement on the ball nut is eliminated; therefore, the need for periodic adjustments to the afore-mentioned items to compensate for backlash between the ball nut and the ball screw is also eliminated. Furthermore, the substitution of the conventional bearing thrust adjuster, thrust adjuster lock nut, and bearing annulus with the spring compliant member facilitates the removal and reinstallation of the ball nut in order to replace the belt that drives the ball nut in the event that the belt breaks or becomes worn.

The inventive ball nut drive assembly includes a ball nut having an aperture extending axially therethrough, a ball screw extending through the aperture of the ball nut and being cooperatively engaged with the ball nut, and a spring compliant member received on the ball screw and positioned adjacent the ball nut. The spring compliant member is tensioned to bias the ball nut in the axial direction along the ball screw. The ball nut is positioned within a housing, preferably fabricated of aluminum, and is generally rotatably supported therein by first and second sets of ball bearings. The spring compliant member is in intimate contact with a first inner surface of the housing and biases the ball nut against a second inner surface of the housing. The first and second inner surfaces may be races that encapsulate the first and second sets of bearings. The spring compliant member may be a spring wave washer, a Belleville washer, or some other type of spring compliant device.

The above-mentioned invention provides various benefits to the use of a ball nut drive assembly. In particular, the reduction in the number of parts and the simplification of the remaining parts reduces the cost of equipment required to manufacture the components. Furthermore, the cost of service on the ball nut drive assembly is reduced in that a reduction in the number of parts lessens the likelihood that the assembly will require service over its lifetime. Moreover, utilizing aluminum in the design, as opposed to cast iron as in the prior art, reduces the cost of the raw material involved in the manufacture of the ball nut drive assembly.

DETAILED DESCRIPTION OF THE INVENTION

Figure 1:
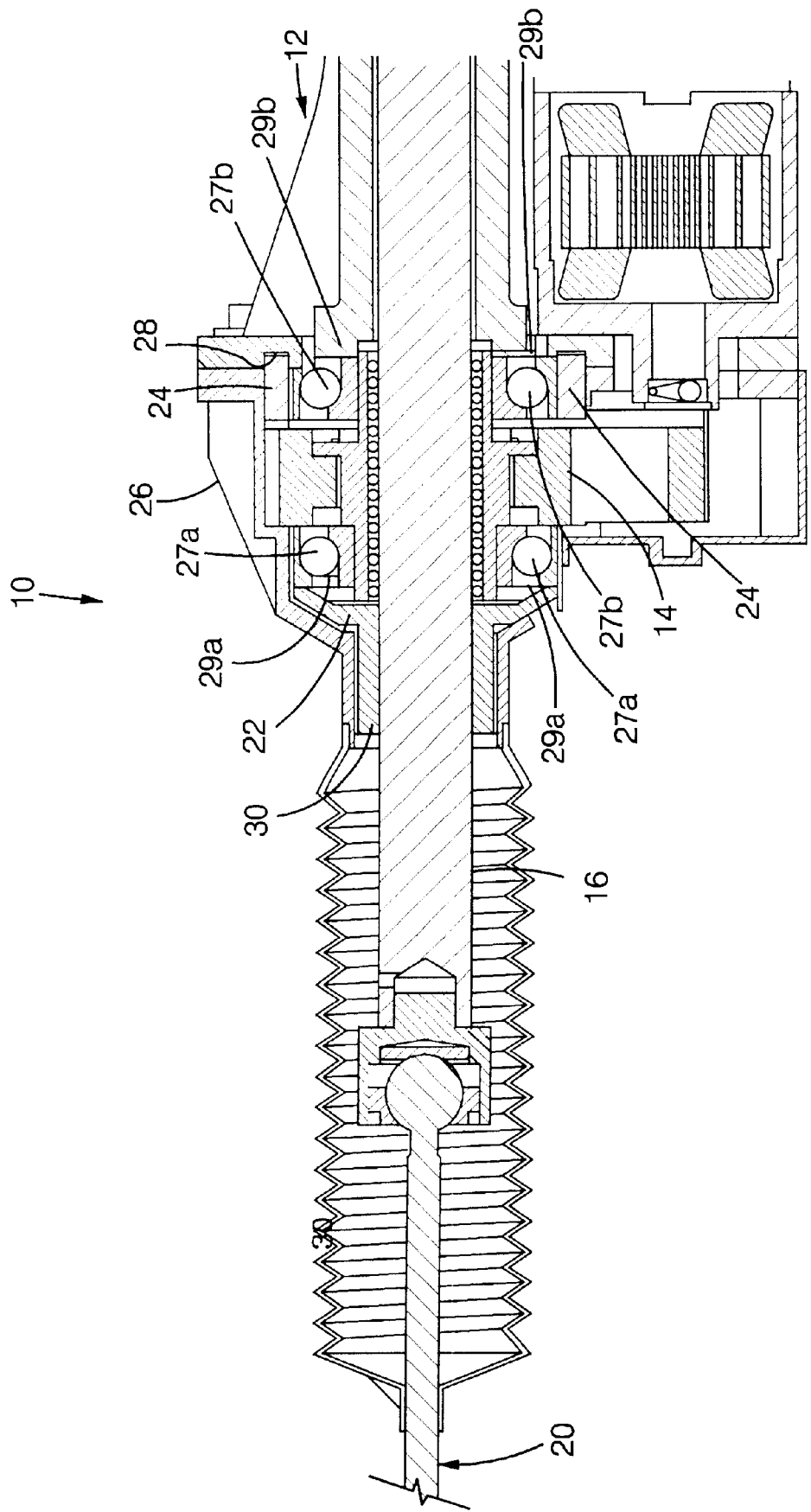
FIG. 1 is a side elevation cutaway view of a ball nut drive assembly of the prior art incorporated into a steering system of a motor vehicle.

Referring to FIG. 1, a steering system is shown generally at 10. Steering system 10 comprises a ball nut drive assembly of the prior art shown generally at 12. The prior art ball nut drive assembly 12 teaches a ball nut 14 that is rotatably supported within a housing 26 and is received on a ball screw 16 that extends therethrough, a bearing thrust adjuster 22 positioned adjacent one end of ball nut 14, and a bearing annulus 24 positioned adjacent an opposite end of ball nut 14. Ball nut 14 is rotatably supported by ball bearings 27a, 27b encapsulated within races 29a, 29b. Bearing thrust adjuster 22 and bearing annulus 24 are each in intimate contact with ball nut 14 and maintain ball nut 14 within housing 26, which is typically fabricated from cast iron. Ball screw 16 forms an intermediate section of a steering rod, shown generally at 20.

Bearing thrust adjuster 22 and bearing annulus 24 are fixedly positioned within housing 26 and serve to provide the traction necessary to enable ball screw 16 to translate through ball nut 14. Bearing annulus 24 is configured and dimensioned to be positioned in a housing pocket 28 disposed in an inner surface of housing 26. Housing pocket 28 is generally a channel formed concentrically about an opening in housing 26 through which ball screw 16 extends. Housing pocket 28 receives and retains bearing annulus 24 therein such that a flat surface of bearing annulus 24 is exposed when bearing annulus 24 is properly received in housing pocket 28. The flat exposed surface of bearing annulus 24 typically functions as a contact surface or a "bumper" against which race 29b of bearing 27b can be driven by ball nut 14, thereby preventing any engagement of ball nut 14 with the inner surfaces of housing 26.

Bearing thrust adjuster 22 includes a concentric aperture therein and is configured and dimensioned to be received on ball screw 16 adjacent race 29a of bearing 27a such that ball screw 16 extends through the opening in housing 26 and through bearing thrust adjuster 22. Bearing thrust adjuster 22 is then securely locked into place within housing 26 using a thrust adjuster lock nut 30. Thrust adjuster lock nut 30, which is positioned on an end of bearing thrust adjuster 22 opposite the end of bearing thrust adjuster 22 that is adjacent race 29a, secures bearing thrust adjuster 22 to housing 26 while simultaneously forcing race 29a and ball nut 14 against race 29b, which is in turn forced against the flat exposed surface of bearing annulus 24. The force exerted on ball nut 14 is pre-loaded due to the dimensions of bearing thrust adjuster 22 and the tensioning of thrust adjuster lock nut 30 on housing 26.

Figure 2:
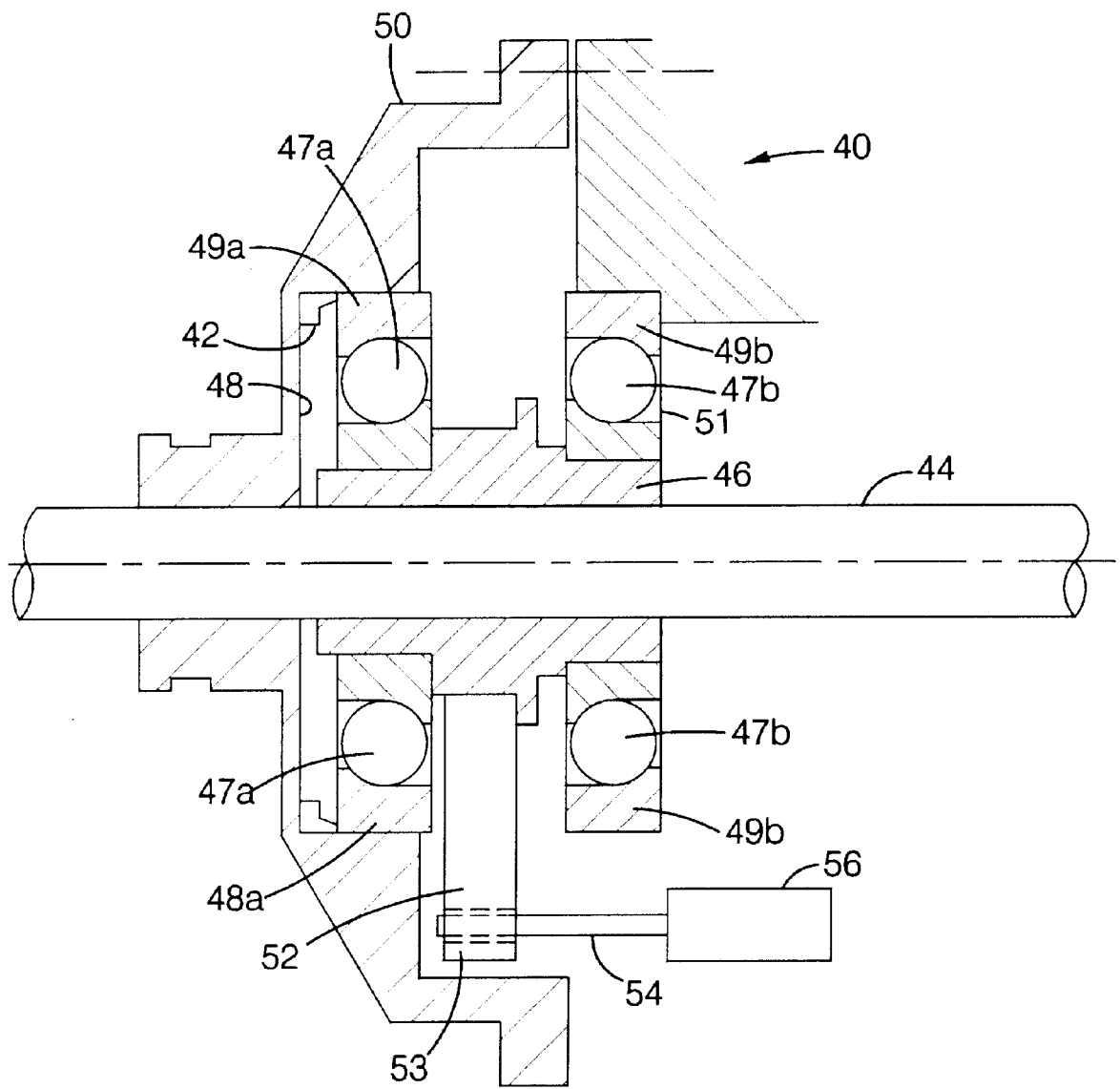
FIG. 2 is a side elevation cutaway view of a ball nut drive assembly, of the present invention, incorporating a spring compliant device.

Referring now to FIG. 2, a ball nut drive assembly embodying the inventive rack/ball nut interface is shown generally at 40. In ball nut drive assembly 40, bearing thrust adjuster 22 and thrust adjuster lock nut 30 of the prior art are replaced with a spring compliant member 42, and bearing annulus 24 is eliminated from the assembly altogether. Ball nut drive assembly 40 includes a ball nut 46 having a bore extending therethrough and is received on a ball screw 44 extending through the bore. Ball nut drive assembly 40 also includes bearings 47a, 47b rotatably fixed within races 49a, 49b and positioned adjacent ball nut 46 that rotatably support ball nut 46 within a housing 50 and a spring compliant member 42 having a hole extending therethrough configured to be received on ball screw 44 adjacent bearing 47a between race 49a of bearing 47a and a first inner surface 48 of housing 50. Spring compliant member 42 is sufficiently tensioned to bias ball nut 46 against a second inner surface 51, which is positioned opposite first inner surface 48 within housing 50. Preferably, housing 50 is fabricated of a lightweight metal such as aluminum.

Spring compliant member 42, in general, functions to counteract loosening processes in screw connections, such as those defined by the engagement of ball nut 46 on ball screw 44 within ball nut drive assembly 40. These loosening processes tend to occur as the result of initial stressing force losses in the screw connections that arise as a consequence of settling or deformation processes in the screw connections. Constant contact between surfaces of the screw connections results in the wearing of those surfaces, which ultimately contributes to the settling or deformation. To avoid such loosening processes, spring compliant member 42 should have a sufficient spring tension that can compensate for an initial stressing force loss generated by the settling or deformation processes. This spring tension should likewise be sufficient to maintain the required clamping force that ensures the operating reliability of the screw connection.

In the preferred embodiment of the invention, spring compliant member 42 is a spring wave washer or a variation thereof. A spring wave washer typically comprises a ring shaped body of a certain thickness having a top side and an underside wherein the body oscillates along a circumference thereof. In an unstressed state, the peaks of the oscillations on the top side of the body provide points on which a flat surface may contact. Likewise, the troughs of the oscillations on the underside of the body provide points on which a second flat surface may contact. When the spring wave washer is stressed by being placed between two flat surfaces upon which forces are acting in opposing directions and each toward the spring wave washer, the spring wave washer will have a tendency to deform, and the amplitudes of the peaks and troughs defined by the oscillations of the body will decrease. In this stressed state, the configuration of the body, viz., the oscillatory shape, imparts elastic characteristics to the spring wave washer. When the body is elastically deformed, the body has a tendency to return to its pre-deformed shape. Thus, a spring wave washer, when trapped between two flat surfaces having opposing forces acting thereon each in the direction of the spring wave washer, will tend to force the flat surfaces apart.

Figure 3:
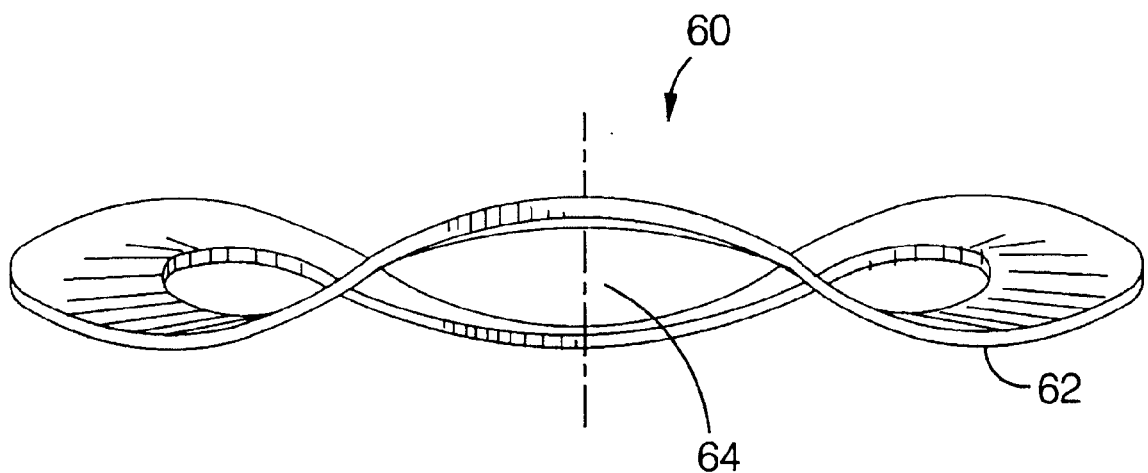
FIG. 3 is a perspective view of a spring wave washer usable as the spring compliant device.

In FIG. 3, a spring wave washer is shown generally at 60. Spring wave washer comprises a cylindrical disk 62 fabricated from a suitable material, such as a metal. An aperture 64 extends through cylindrical disk 62 and is preferably centrally located therewithin. The body of cylindrical disk 62 oscillates in an axial direction around the circumference of the body, the oscillations thereby allowing spring wave washer 60 to be elastically deformable when compressed axially in ball nut drive assembly 40 between first inner surface 48 of housing 50 and race 49a. In order to provide optimum stability to ball nut 46 as ball nut 46 is positioned on ball screw 44, the number of full oscillations on spring wave washer 60 should be three or more, which gives that number of points at which spring wave washer 60 rests against first inner surface 48 of housing 50 and against race 49a.

Figure 4:
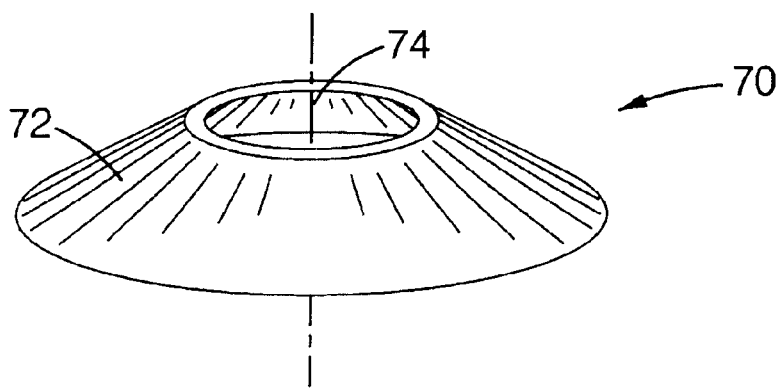
FIG. 4 is a perspective view of a Belleville washer usable as the spring compliant device.

Referring to FIG. 4, a second type of spring compliant member 42 is a Belleville washer, shown generally at 70, which comprises a frustoconically. shaped body portion 72 having an aperture 74 extending therethrough. Belleville washer 70 functions similarly to spring wave washer 60; however, in the use of Belleville washer 70, continuous contact is maintained between the outer edge of body portion 72 and housing 50, as well as between the edge of body portion 72 adjacent aperture 74 and race 49a.

Whether spring compliant member 42 is either spring wave washer 60, Belleville washer 70, or another type of washer, a bearing preload is maintained on ball nut 46 without the use of bearing thrust adjuster 22, thrust adjuster lock nut 30, and bearing annulus 24 of the prior art. In particular, spring compliant member 42 can generally be fabricated to exert a specified required tension when installed into a ball nut drive assembly having certain dimensions. Furthermore, without the above-mentioned prior art components, adjustments can be more easily made to ball nut drive assembly 40. For example, referring back to FIG. 2, a belt 52 that is rotatably connected to a pulley 53 that drives ball nut 46 upon the rotation of a rotor shaft 54 of a drive motor 56 can be serviced with a minimum amount of effort if the removal and reinstallation of a minimum amount of parts, namely, spring compliant member 42, is required.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A ball nut drive assembly, comprising:
   a ball nut having a bore extending axially therethrough;
   a ball screw extending through said ball nut and being cooperatively engaged therewith;
   a housing having said ball nut drive assembly positioned therein, wherein said ball nut is rotatably supported within said housing by ball bearings; and a spring compliant member positioned about said ball screw between said housing and only one of said ball bearings, said spring compliant member being configured to apply a biasing force to said ball nut in an axial direction along said ball screw, said biasing force being sufficient to continuously counteract loosening processes associated with said ball nut being cooperatively engaged with said ball screw.

2. The ball nut drive assembly of claim 1 wherein said spring compliant member is in intimate contact with a first inner surface of said housing and is positioned adjacent said ball nut so as to bias said ball nut against a second inner surface of said housing.

3. The ball nut drive assembly of claim 2 wherein a first bearing race containing a first set of ball bearings is positioned intermediate said spring compliant member and said ball nut.

4. The ball nut drive assembly of claim 2 wherein a second bearing race containing a second set of ball bearings is positioned intermediate said ball nut and said second inner surface of said housing.

5. The ball nut drive assembly of claim 2 wherein said spring compliant member is a spring wave washer.

6. The ball nut drive assembly of claim 2 wherein said spring compliant member is a frustoconically shaped washer.

7. The ball nut drive assembly of claim 1 wherein said housing is fabricated of aluminum.

8. A steering system, comprising:

a housing;

a ball nut rotatably supported within said housing by a pair of ball bearings;

a ball screw extending through said ball nut and being cooperatively engaged therewith such that rotation of said ball nut causes said ball screw to move linearly with respect to an axis of said housing; and a spring compliant member positioned between a portion of said housing and one of said ball bearings, said spring compliant member being sufficient to bias said ball nut along said axis and compensate for backlash between said ball nut and said ball screw caused by wear associated with said ball nut being cooperatively engaged with said ball screw.

9. The steering system as in claim 8, wherein said spring compliant member has a hole extending therethrough configured to be received on said ball screw between said portion of said housing and said one of said ball bearings.

10. The steering system as in claim 8, wherein said housing is fabricated of aluminum.

11. The steering system as in claim 8, wherein said spring compliant member is a spring wave washer or a frustoconically shaped washer.

12. A steering system, comprising:

a housing;

a ball nut rotatably supported within said housing by a pair of ball bearings;

a ball screw threadably engaged with said ball nut such that rotation of said ball nut causes said ball screw to move with respect to an axis of said housing; and a spring compliant member positioned between a portion of said housing and only one of said ball bearings, said spring compliant member being configured to bias said ball nut along said axis in order to provide a selected clamping force on said ball screw to continuously compensate for wear of said ball screw and said ball nut caused by normal use of the steering system.

13. The steering system as in claim 12, wherein said spring compliant member is a spring wave washer or a frustoconically shaped washer.

14. The steering system as in claim 12, wherein said ball nut is operatively engaged to a belt, said belt being rotatable by a drive motor such that said drive motor selectively rotates said ball nut.

* * * * *